US006515940B2

(12) United States Patent
Suppa et al.

(10) Patent No.: US 6,515,940 B2
(45) Date of Patent: Feb. 4, 2003

(54) ELECTRODYNAMIC TRANSDUCER FOR UNDERWATER ACOUSTICS

(75) Inventors: Vito Suppa, Roquefort les Pins (FR); Michel Letiche, Vallauris (FR); Michel Lattard, La Colle sur Loup (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 09/864,313

(22) Filed: May 25, 2001

(65) Prior Publication Data

US 2002/0034124 A1 Mar. 21, 2002

(30) Foreign Application Priority Data

May 26, 2000 (FR) ........................................... 00 06766

(51) Int. Cl.[7] ......................... H04R 17/00; B06B 1/04; G01K 11/00

(52) U.S. Cl. ....................................................... 367/172

(58) Field of Search ................................ 367/172, 173, 367/171, 167, 165, 142

(56) References Cited

U.S. PATENT DOCUMENTS

| | | | |
|---|---|---|---|
| 3,757,888 A | 9/1973 | Lagier et al. | 181/0.5 |
| 4,029,141 A | 6/1977 | Ferrari et al. | |
| 4,068,209 A | 1/1978 | Lagier | |
| 4,279,025 A | 7/1981 | Suppa | |
| 4,295,211 A | 10/1981 | Suppa et al. | |
| 4,380,440 A | 4/1983 | Suppa | |
| 4,736,350 A | 4/1988 | Massa | |
| 4,883,143 A | 11/1989 | Lagier | |
| 4,970,706 A | 11/1990 | Tocquet et al. | |
| 4,991,152 A | 2/1991 | Letiche | |
| 5,062,089 A | 10/1991 | Willard et al. | |
| 5,111,697 A | 5/1992 | Habermann et al. | |
| 5,144,597 A | 9/1992 | Lagier et al. | 367/166 |
| 5,431,058 A | 7/1995 | Lagier et al. | 367/167 |
| 5,795,203 A | 8/1998 | Suppa et al. | |
| 6,035,524 A | 3/2000 | Suppa et al. | |
| 6,046,962 A | 4/2000 | Suppa et al. | 367/172 |
| 6,144,342 A | 11/2000 | Bertheas et al. | |
| 6,345,014 B1 | 2/2002 | Edouard et al. | 367/165 |

FOREIGN PATENT DOCUMENTS

| | | | |
|---|---|---|---|
| EP | 1157751 A1 * | 11/2001 | B06B/1/04 |
| FR | 2 764 160 | 12/1998 | |
| GB | 2 231 153 A | 11/1990 | |

* cited by examiner

*Primary Examiner*—Daniel T. Pihulic
(74) *Attorney, Agent, or Firm*—Oblon, Spivak, McClelland, Maier & Neustadt, P.C.

(57) ABSTRACT

Disclosed is an electrodynamic transducer designed to emit acoustic waves in a sea environment while being capable of withstanding external explosions. The lower pole piece of such a transducer is drilled with vertical holes enabling air to circulate inside the transducer in order to efficiently cool the coil that makes it work. Light metal masses that are good heat conductors, attached between the magnets which excite the pole pieces, furthermore drain the heat out of the transducer. The efficiency of such a transducer is increased by at least 4.

5 Claims, 2 Drawing Sheets

ELECTRODYNAMIC TRANSDUCER FOR UNDERWATER ACOUSTICS

BACKGROUND OF THE INVENTION

1. Field of the Invention

The present invention relates to electrodynamic type transducers that enable the transmission, within the sea, of acoustic waves and more particularly sound waves. These transducers are particularly useful in sonar technology.

2. Description of the Prior Art

It is the practice in underwater acoustics to use towed fish comprising electronic instruments and various transducers that can work in transmission, reception and possibly in both transmission and reception.

It is known that, in order to be able to emit sufficient acoustic power at low frequencies, typically frequencies of 10 Hz to 1 kHz, it is necessary to move substantial masses of water. This requires a shift, itself substantial, of the active face of the transducer. This generally leads to the use, in this case, of an electrodynamic type transducer comprising a horn driven by a mobile coil located in a gap. Transducers of this type are thus quite similar to loudspeakers which are well known in musical acoustics.

To be able to obtain the acoustic power frequently needed in certain applications, given the sound level to be attained which can be as much as 150 dB at 10 Hz, it becomes necessary to use relatively large-sized transducers. This leads to constraints of both volume and weight, because the transducer has to be immersed in the sea while being placed in a fish that has to navigate at a predetermined depth of immersion.

In a French patent filed on May 27 1997 under No. 97 06457 published on Dec. 4, 1998 and under No. 2 764 160, delivered on Aug. 27, 1999, the present Applicant has described and claimed an electrodynamic transducer of this type that deliver high acoustic power. This transducer has a reasonable volume and mass while being especially designed to withstand underwater explosions that sometimes occur in the vicinity of these transducers.

This prior art transducer, shown in the appended FIGS. 1 and 2, comprises a body formed by a base 101 into which there is fixed a jacket 102 surmounted by a cup 103. These different parts are fitted into one another so as to demarcate cylindrical cavities with a shape generated by revolution around the axis of the transducer. The other parts forming this transducer get inserted into these cylindrical cavities.

A first cylindrical cavity demarcated between the base and the jacket maintains a magnetic circuit formed by a first pole piece and a second pole piece, 104 and 105, in the shape of crowns centered on the axis of the transducer. The first pole piece 104 is L-shaped with the inner arm of the L extending into the central chamber of the transducer. The second pole piece 105 has the shape of a flat washer or disc. Both are kept separate by a set of magnets 106 to which they are clamped by the adjustment of the jacket 102 in the base 101. In this way, there is obtained a magnetic circuit that is stopped only by a thin gap 107 taking the shape of a cylinder centered on the axis of the transducer and coming to a position where it is flush with the internal lateral surface of the cup 103.

The central space of the body of the transducer forms a second cylindrical cavity in which a mushroom-shaped core 108 gets embedded by its central stem in the central circular aperture of the pole piece 104. The lower part of the head of the core, which has an appreciably hemispherical shape, rests on the upper part of this same pole piece 104.

The mobile structure of the transducer is formed by a hollow part 109 having the shape of a dome capping a cylindrical part that gets engaged in the gap 107. In order that this part may be very solid, very light and very rigid all at the same time, it is formed for example by a carbon fiber fabric embedded in a resin matrix. According to the invention, the upper surface of the dome 109 is covered with a part 110 whose upper surface is appreciably flat. This part 110 forms the radiating horn of the transducer. In order that it may be very light, it is made for example out of syntactic foam.

The horn 110 thus behaves like a piston whose lateral external surface is cylindrical. This piston slides in a cylinder formed by the lateral internal surface of the cup 103, which is itself appreciably cylindrical. According to the invention, these two parts, and more particularly the horn 110, are made so as to have an extremely tight-fitting clearance of about 0.2 mm for example. Thus a mechanical filter is formed. This mechanical filter slows down the propagation of the shock wave that could arise out of an external explosion if any by flattening, in this interstice, the fluid in which the horn bathes.

To protect the horn, the upper part of the central space of the body of the transducer is filled with a fluid, an oil for example, suited both to this protection and to the propagation of the acoustic waves. To prevent this oil from escaping, the space 113 is closed at its upper part by a membrane 112 fixed to the rim of the cup 103.

To enable the play of the dome and the horn, the lower part of the central space, opposite the part in which this oil is located, is for its part filled with air. To then prevent the oil contained in the part 113 from re-entering the air-filled part 114, another tight-sealing membrane 115 is used. This tight-sealing membrane is made of rubber for example. It is much more flexible than the membrane 112 and is fixed, on the one hand, to the external lateral wall of the horn 110 and, on the other hand, to the interior side wall of the cup 103. This fixing is obtained by clamping between this cup 103 and the jacket 102. To enable a free and appropriate play of this membrane between is the horn and the cup, the external side surface of the horn is machined on this level so as to be recessed with respect to the adjutage 111 which has the tight clearance described here above, and so as to form an unoccupied space for the membrane 115.

Moreover, in order that the clearance of the adjutage 111 may be maintained despite the bending loads applied to the dome 109 and the horn 112 during the play undergone by these parts when the transducer works with high emission power, this assembly is stiffened by means of a set of radial ribs 116 that are distributed on the inner periphery of the dome 109 and meet in a star arrangement below the lower part of the stem of the mushroom forming the core 108. These ribs slide in grooves 117 made in the core 116 and the first pole piece 104. These grooves are relatively broad at the core and are narrower at the pole piece to minimize the loss of magnetic flux, which can be reduced to a very low value of a few percent.

An shaft 118 joins the center of the upper part of the dome 109 to the center of the star formed by the meeting of the ribs 116, below the lower face of the core 108. This shaft both stiffens the assembly and, at the same time, ensures its vertical centering in relation to the axis of the transducer. To fulfill this second function, the shaft is fixed by its lower part to the center of a leaf spring 119 that is itself fixed circumferentially in the lower part of the base 101. This spring, of the type known as a "flector", is formed by a flexible and elastic disc with circumferential apertures that let air pass freely into the lower part of the central space of the transducer, between the two parts demarcated by the plane of this spring. This spring not only ensures the centering but also prevents rotational movements in the mobile structure that make the ribs rub against the walls of the grooves in which they slide.

The driving action, which moves the dome-horn unit along the axis of the transducer to emit acoustic waves, is obtained by the interaction between the magnetic field that circulates between the pole pieces and the magnetic field delivered by a coil 120 wound on the lateral flanks of the lower cylindrical part of the dome 109. This coil is thus plunged in the gap existing between the two pole pieces. This gives the standard arrangement of an electrodynamic transducer. This coil is fed by means that are not shown on the figure and are known in the prior art.

In addition to the function of stiffening the mobile structure, the ribs 116 also serve as a heat sink all along the height of the coil 120, to dissipate the heat released at this level in directing it towards the other parts of the transducer.

The internal part 114 demarcated by the dome 109, the base 101 whose bottom is closed, the jacket 102 and the tight-sealing membrane 115 is filled with air to allow the play of the mobile structure, as was seen further above.

When the transducer is immersed, the mobile structure, under the effect of the hydrostatic pressure, plunges towards the bottom of the base 101, compressing the spring 119 and the volume of air included in this part 114. This motion naturally tends to modify the electroacoustic characteristics of the transducer, in particular by modifying the respective positions of the coil and of the pole pieces.

To compensate, at least partly, for this effect, a compensation reservoir or air chamber 121 is used. This air chamber 121 is formed by a flexible pocket, made of rubber for example, subjected to the pressure of the sea environment and communicating with the part 114 by means of a conduit 122. To protect this air chamber against the effect of possible explosions occurring in the sea environment, it has a toroidal shape and is located in another internal cylindrical cavity 123 that is demarcated within the transducer by the walls of the jacket 102 and the cup 103. This cavity is thus itself toroidal and closed, and it surrounds the site of the horn 110. So that the air chamber placed inside this cavity can be subjected to sea pressure, small apertures 124 are made in the lateral external wall of the jacket 102. These apertures 124 allow sea water to penetrate the cavity 123 and compress the air chamber. In this way, the air chamber is protected against external mechanical forces by the walls of the cavity in which it is located. Moreover the diameter of the apertures 124 is designed so that the shock waves coming from any external explosion are attenuated when passing through these apertures, so that they do not present any danger of excess pressure in the air chamber. Since these apertures are round, their diameter can be greater than the thickness of the fit 111.

A transducer of this kind works perfectly well and can withstand, for example, an explosion of one ton of TNT at a distance of 30 meters.

However, owing to the constant development of technology, it is becoming necessary to further increase the acoustic power delivered in a transducer of this type. This comes up against technological limits arising especially out of the heat dissipation capacities in terms of the heat released in the control coil of the mobile equipment.

Indeed, the high current which then flows in the coil 120 leads to substantial local heating that can no longer be properly dissipated by the means hitherto provided, especially the ribs 116.

This heating ultimately causes a deterioration of the coil, especially at the base, namely on the side opposite the horn. This deterioration is irreversible and, when it occurs, requires costly repairs.

SUMMARY OF THE INVENTION

To increase the heat dissipation at this level, and thus prevent this deterioration, the invention proposes an electrodynamic transducer for underwater acoustics of the type comprising a body fitted with pole pieces defining a gap, a mobile structure fitted with a dome extended by a cylinder supporting a coil that slides in this gap, and a flexible membrane that provides tight sealing between the mobile structure and the body in determining an internal air-filled part, and a horn surmounting said dome and sliding in said body by forming an adjutage with said body, the value of whose clearance is fixed so as to enable the protection of said membrane against the shock waves coming from explosions external to the transducer by flattening these shock waves in said adjutage, wherein chiefly one of the said pole pieces is provided with at least one aperture enabling the circulation of air inside the internal part to efficiently cool said coil.

According to another characteristic, the device furthermore comprises a heat-conducting mass located between the said pole pieces to drain the heat released by the coil towards the exterior of the transducer.

According to another characteristic, the invention furthermore comprises a set of magnets placed between the pole pieces, wherein it furthermore comprises a set of heat-conducting masses interposed between the magnets.

According to another characteristic, said heat conductive masses are made of aluminum.

BRIEF DESCRIPTION OF THE DRAWINGS

Other features and advantages of the invention shall appear more clearly in the following description, given by way of a non-restrictive example with reference to the appended figures, of which.

MORE DETAILED DESCRIPTION

Figure 1:
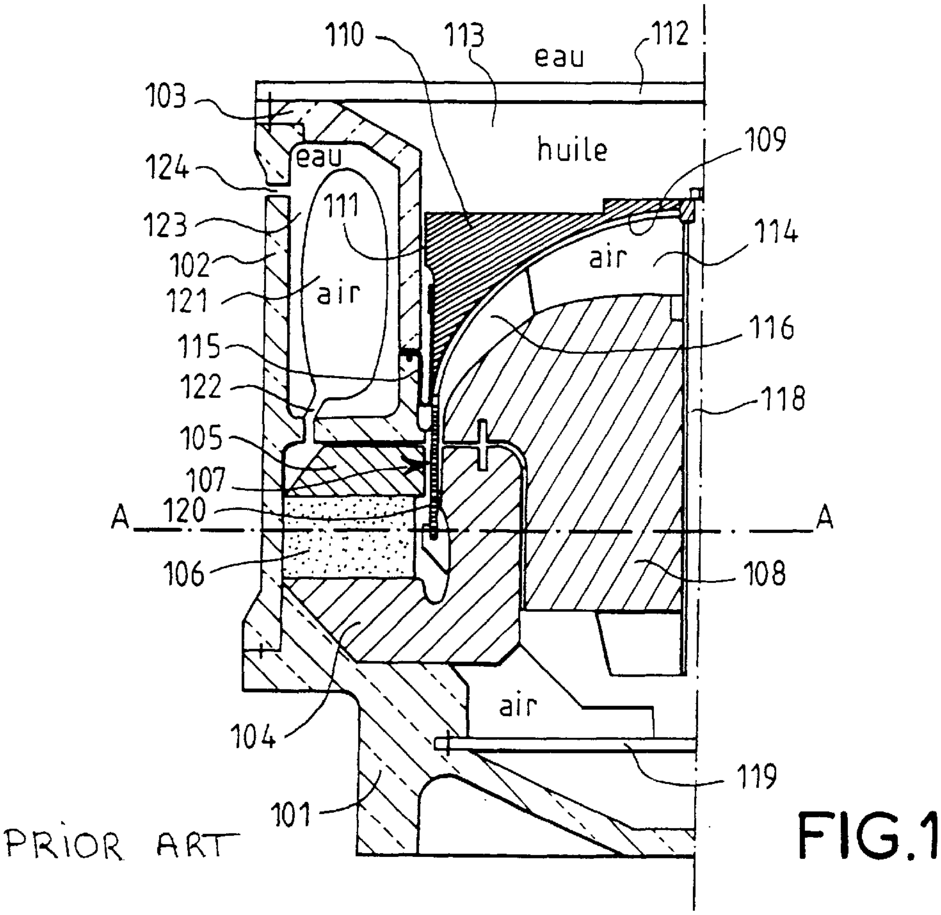
PRIOR ART FIG.1
FIGS. 1 and 2 are sectional views of a prior art transducer.
Figure 2:
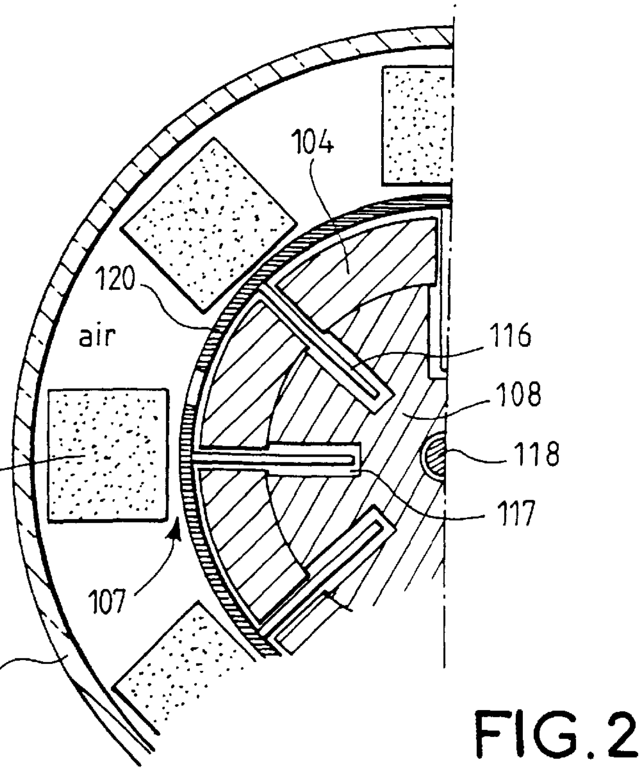
PRIOR ART FIG.2

An intensive analysis of the working of the transducers according to the prior art has shown that inefficient cooling of the coil 120, especially in its lower part, arises firstly from the fact that the heat conduction towards the top of the coil is insufficient and, secondly, that there is very little local dissipation at the bottom of the coil by conduction at that level. Indeed, the base of the coil is placed in a part 130 of the internal cavity 114 that is narrow and confined. In this way, the mass of air trapped at this level cannot be renewed to enable efficient cooling by convection. It is too low to absorb a sufficient quantity of heat by itself, and the lateral dimensions are nevertheless far too great to allow heat to be discharged to the pole pieces by direct conduction through this mass of air. The present invention therefore proposes to get rid of the confinement of air in this part 130 into which the lower part of the coil 120 is plunged. This is achieved by making holes 131 in the magnetic circuit 104. These holes, which are substantially vertical in this embodiment, therefore make the part 130 of the cavity 114 communicate with the part 126 of the same cavity, located at the bottom of the transducer beneath the core 108. The additional communication thus created between the part 125 of the cavity 114, located above this core 108 and this part 126, enables a circulation of air. This air, in getting heated in contact with the coil 120, rises in the part 125, cools in contact with the different massive parts of the transducer and then returns to the part 126 of the cavity 114, descending again through the different holes located in the central part of the transducer.

Figure 3:
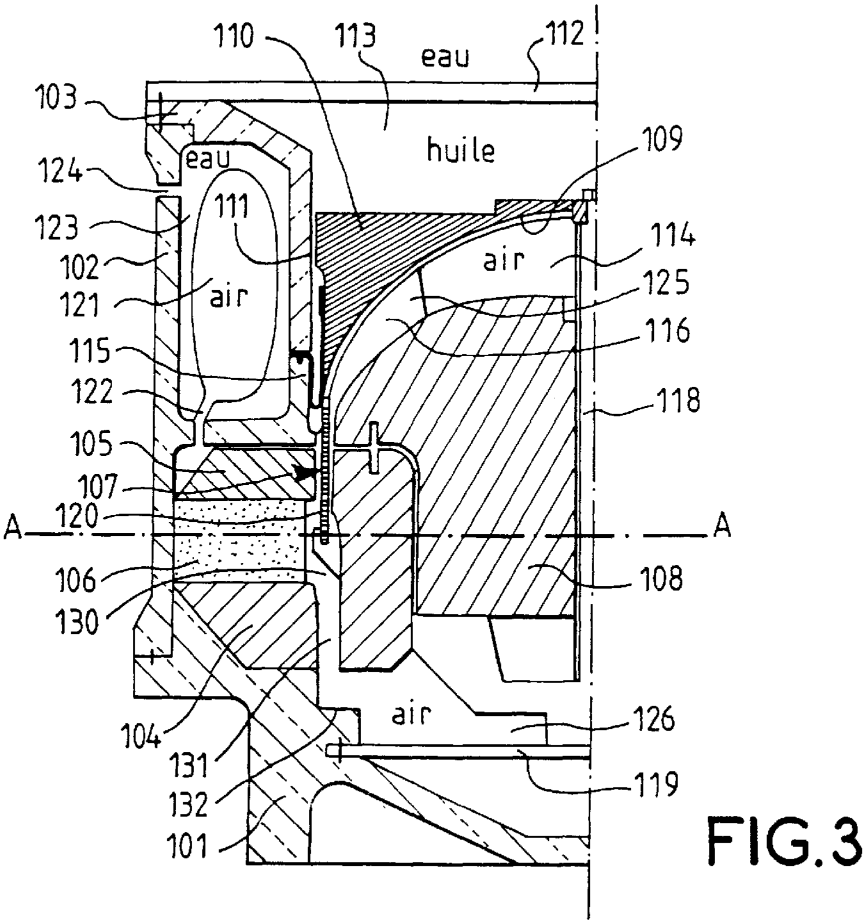
FIGS. 3 and 4 are sectional views, in the same conditions, of a transducer of the same type modified according to the invention.
Figure 4:
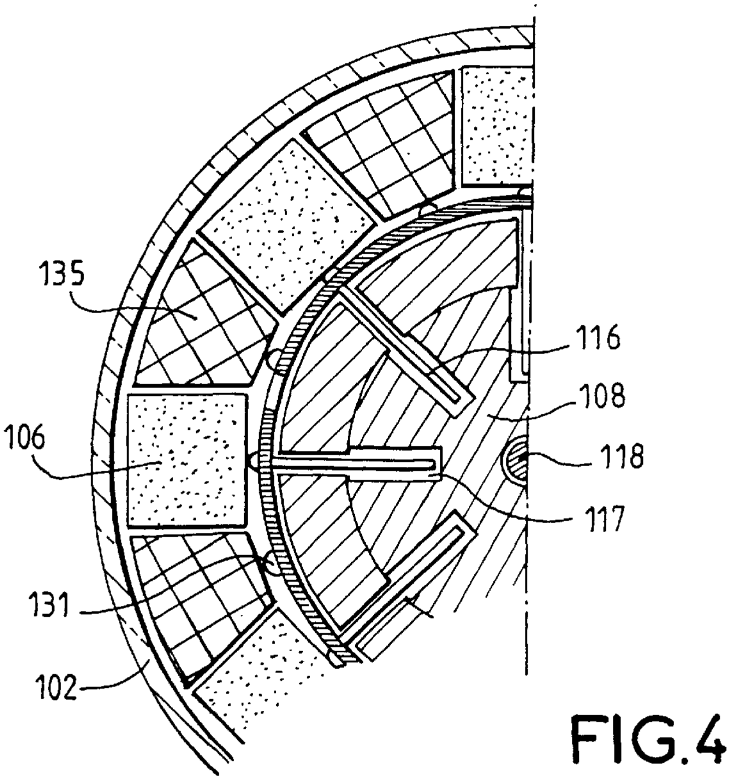

To facilitate the making of these apertures 131, the invention proposes, in the exemplary embodiment shown in FIGS. 3 and 4, the machining of the base part 101 of the pack, inside this pack, at the part 126 of the cavity 114, in milling its interior so as to make a circular shoulder 132 in order that the holes 131 can themselves be machined vertically while opening out into the part 126 of the cavity 114.

Since ultimately the released heat gets dissipated in the sea water surrounding the transducer, at least after a certain period of operation, the invention proposes to improve the transfer of heat from the interior of the transducer, especially from the volume of air that flows in the part 130 of the cavity 114, by placing metal masses 135 between the magnets 106. These metal masses 135 form heat sinks between the interior of the transducer and the external medium, by means of the jacket 102. These metal masses are machined to provide a maximum thermal path for the released heat by occupying the greatest possible amount of space between the magnets. They are made out of a material that is as heat conductive as possible while remaining light enough not to burden the mass of the transducer. The most appropriate materials for this use include aluminum. They are held for example by being bonded to the pole piece 104 or possibly by being clamped between the pole pieces 104 and 105 in the same way as the magnets 106.

Experience has shown that a transducer made in this way can withstand current at least four times greater than the permissible current in a prior art transducer without its being necessary to make any modification in the rest of the transducer, especially the coil, and in obtaining identical performance without any deterioration.

What is claimed is:

1. An electrodynamic transducer for underwater acoustics comprising:

a body fitted with pole pieces defining a gap;

a mobile structure fitted with a dome extended by a cylinder supporting a coil that slides in the gap;

a flexible membrane that provides tight sealing between the mobile structure and the body in determining an internal air-filled part; and a horn surmounting said dome and sliding in said body in forming an adjutage with said body, a value of whose clearance is fixed to enable protection of said membrane against shock waves coming from explosions external to the transducer in flattening the shock waves in said adjutage, wherein one of the said pole pieces is provided with at least one aperture enabling circulation of air inside the internal part to efficiently cool said coil.

2. A transducer according to claim 1, wherein the device further comprises a heat-conducting mass located between said pole pieces to drain heat released by the coil out of the transducer.

3. A transducer according to claim 2, further comprising:

a set of magnets placed between the pole pieces; and a set of heat-conducting masses interposed between the magnets.

4. A transducer according to claim 2, wherein said heat-conducting mass is made of aluminum.

5. A transducer according to claim 3, wherein said heat-conducting mass is made of aluminum.

* * * * *